(12) United States Patent
Borque Marquina et al.

(10) Patent No.: US 8,511,117 B2
(45) Date of Patent: Aug. 20, 2013

(54) PLASTIC WASHING-MACHINE TUB

(75) Inventors: Noelia Borque Marquina, Saragossa (ES); Miguel Angel Gomez Caudevilla, Saragossa (ES); Ismael Garcia Bobed, Saragossa (ES); Alberto Mañas Molina, Saragossa (ES); Eduardo Recio Ferrer, Saragossa (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 856 days.

(21) Appl. No.: 12/673,789

(22) PCT Filed: Sep. 2, 2008

(86) PCT No.: PCT/EP2008/061573
§ 371 (c)(1),
(2), (4) Date: Feb. 17, 2010

(87) PCT Pub. No.: WO2009/030688
PCT Pub. Date: Mar. 12, 2009

(65) Prior Publication Data
US 2011/0023557 A1 Feb. 3, 2011

(30) Foreign Application Priority Data
Sep. 7, 2007 (ES) .................................. 200702457

(51) Int. Cl.
*D06F 21/00* (2006.01)
*D06F 23/00* (2006.01)
*D06F 37/26* (2006.01)
*D06F 37/00* (2006.01)
*D06F 39/00* (2006.01)
*D06B 3/00* (2006.01)
*D06B 3/20* (2006.01)

(52) U.S. Cl.
USPC .................. 68/140; 68/139; 68/142; 68/143; 68/175; 68/181 R; 68/208; 68/232

(58) Field of Classification Search
USPC .............. 68/139, 140, 142, 143, 175, 181 R, 68/208, 232
See application file for complete search history.

(56) References Cited

U.S. PATENT DOCUMENTS

| | | | |
|---|---|---|---|
| 4,423,607 A * | 1/1984 | Munini | 68/23.2 |
| 2004/0123633 A1* | 7/2004 | Jo | 68/23 R |
| 2007/0175245 A1 | 8/2007 | Kim et al. | |
| 2010/0018011 A1* | 1/2010 | Borque Marquina et al. | 24/457 |

FOREIGN PATENT DOCUMENTS

ES 284569 7/1985

* cited by examiner

*Primary Examiner* — Joseph L Perrin
*Assistant Examiner* — Charles W Kling
(74) *Attorney, Agent, or Firm* — James E. Howard; Andre Pallapies (57) ABSTRACT

A plastic washing-machine tub with a front wall, a rear wall and a cylindrical wall enclosing an inner tub compartment, which comprises: two tub shells made from injection-molded plastic that can be connected together by means of an assembly plane in a tub closure direction, the first tub shell comprising the front wall and the second tub shell comprising the rear wall; an integral bulge emerging from the cylindrical wall and defining a cavity connected to the inner tub compartment, the bulge having at least one inlet and/or outlet opening. The assembly plane divides the bulge into two parts, a first bulge part being arranged in the first tub shell and a second bulge part in the second tub shell.

18 Claims, 10 Drawing Sheets

PLASTIC WASHING-MACHINE TUB

BACKGROUND OF THE INVENTION

The invention relates to a plastic washing-machine tub with a front wall, a rear wall and a cylindrical wall enclosing an inner tub compartment, which comprises two tub shells made from injection-molded plastic that can be connected together by means of an assembly plane in a tub closure direction, the first tub shell comprising the front wall and the second tub shell comprising the rear wall, and it also comprises an integral bulge emerging from the cylindrical wall and defining a cavity connected to the inner tub compartment, the bulge having at least one inlet and/or outlet opening.

Utility model ES284569U describes a top-loading washing machine with a horizontal drum that comprises a plastic tub designed to contain washing and rinsing water, the back wall of which has a cavity with a horizontal opening from which emerges an emptying pipe leading to an emptying pump. The cavity is located at the lowest point of the tub and acts as a sink, allowing continuous operation of the pump until the tub has been emptied. The tub is formed by a tub shell and a tub lid.

The cavity of the tub is formed in the tub shell and has a depth that is smaller than its horizontal dimensions. The cavity comprises a pipe in the form of a labyrinth formed by an extension of the tub lid on being inserted in the cavity with the purpose of limiting the falling of solid bodies inside the emptying pipe. The labyrinth-like emptying pipe communicates with the inside of the tub via a hole located in a substantially vertical lateral wall of the cavity. The cavity then functions as a receptacle inside which the solid bodies collect, without being aspirated by the emptying pump.

BRIEF SUMMARY OF THE INVENTION

The object of the invention is to provide a plastic washing-machine tub of simplified structure in order to allow easier production, and with an inlet and/or outlet for washing liquids that allows better circulation of those liquids.

This objective is achieved by means of a plastic washing-machine tub with a front wall, a rear wall and a cylindrical wall enclosing an inner tub compartment, which comprises: two tub shells made from injection-molded plastic that can be connected together by means of an assembly plane in a tub closure direction, the first tub shell comprising the front wall and the second tub shell comprising the rear wall; an integral bulge emerging from the cylindrical wall and defining a cavity connected to the inner tub compartment, the bulge having at least one inlet and/or outlet opening; characterized in that the assembly plane divides the bulge into two parts, a first bulge part being arranged in the first tub shell and a second bulge part in the second tub shell, one of the bulge parts having at least one part of the inlet and/or outlet opening, and characterized in that the bulge has a conduit in the tub closure direction divided by the assembly plane that places the cavity in communication with the inlet and/or outlet opening.

In this way, the tub may be produced in the form of two separate pieces, the first and second tub shells, from a piece of injection-molded plastic in which the inlet and/or outlet opening is configured in the form of a bulge that is divided and located partially in each one of the shells, thereby dispensing with the use of runners during injection-molding of the plastic, this being the principal advantage of the invention. The closure/joining direction of the shells of the tub is the same as the demolding direction of each of the shells in the injection-molding machine, and it is perpendicular to the assembly plane. When the two shells of the tub are hermetically joined, the bulge is sealed by means of the parting line of those shells. The parting line is preferably delimited by three points in space, but may, alternatively, be staggered.

The bulge of the cylindrical wall of the tub defines a cavity extending toward the outside of the tub and delimited by the bulge. The opening is arranged in the bulge. As the conduit is defined in the closure direction of the tub, the passage delimiting the conduit, connecting the inside of the tub with the inlet and/or outlet opening for the water, is easy to design in an injection mold for plastic.

The conduit also guides the liquid in the inlet and/or outlet of the tub.

In one embodiment, one of the bulge parts comprises the entire inlet and/or outlet opening, which is open in the tub closure direction, and the conduit part of said bulge part is tubular.

In this way, the opening is produced in the mold entirely in the form of a single shell, and it is thus more hermetic since the assembly plane of the tub does not divide it, given that plastic burrs may be generated during the injection process. In any event, these plastic burrs may be cleaned off by machining after the process of injection-molding of the shell.

In another embodiment, the assembly plane divides the inlet and/or outlet opening, leaving a first opening part in the first bulge part and a second opening part in the second bulge part, and the conduit in each part of the bulge has an at least partial channel form, forming a tubular conduit when the tub is closed.

Thus, the opening may be directed in any direction, with the advantage that drainage pipes or supply tubes may be more conveniently connected up to it. In this way, also, it is possible to demold the shells in the opening zone without having to use runners.

In any of the above embodiments, provision is also made for the bulge to have a ventilation hole. In one embodiment, the ventilation hole is formed in the assembly plane, part of the hole being defined in the first shell and part in the second shell. Thus, the ventilation hole may be directed in any direction, with the advantage that connection tubes necessary for the pressure-control systems can be connected up more conveniently thereto. In this way, also, the shells can be demolded in the opening zone without having to use runners.

In another embodiment, the ventilation hole is open in the tub closure direction, and thus the hole is produced in the mold entirely in a single shell, and it is therefore more hermetic at its mouth since the assembly plane of the tub does not divide it and when the shell is injection-molded no plastic burrs are left therein.

The two tub shells are connected together by means of the assembly plane using a welding technique such as vibration welding, casting welding, hot plate welding and/or ultrasonic welding. This system for closing the tub, by joining shells using welding, guarantees hermetic closure of the tub. Another joining system requires seals or other components that make assembly more complex and may lead to leakages of liquid in the bulge zone. A welded join is much more reliable.

The bulge is centered in the cylindrical wall, projecting therefrom at a bulge distance from the front wall and/or from the rear wall. In this way, drainage or the introduction of liquid from or into the tub will be more centered in the lateral wall of the tub, thereby improving the internal flow.

The tub being in the operating position, the bulge is arranged in an upper tub part and the inlet and/or outlet opening is an opening for the inlet of washing water into the inner tub compartment.

The operating position of the tub should be understood as the tub being installed inside the frame of the washing machine. The front wall and the rear wall are in an essentially vertical position and the axis defined by the lateral cylindrical wall of the tub is parallel to the floor. Normally, in front-loading washing machines tubs are not tilted and the central axis thereof, via which the drum rotates and which is defined by the cylindrical wall, is parallel to the floor on which the machine rests. The upper part of the tub is then that part of the tub above the axis of rotation that is most distant from the floor and the lower tub part, which is defined below the axis of rotation of the drum, is the closest to the floor. In addition, the same situation obtains in machines in which the tub is tilted in order to facilitate user access, the central axis not being parallel to the floor, and in top-loading machines, in which the tub is uniformly arranged. Thus, this embodiment describes the water inlet that is normally, although not necessarily, arranged in the higher part of the upper part of the tub.

In another embodiment, the tub being in the operating position, the bulge is arranged in the lower part of the tub and the inlet and/or outlet opening is an opening for the outlet of washing water for draining water from the inner tub compartment.

In this case, it is preferable for the bulge to be arranged in the bottom part of the lower tub part, as this facilitates drainage of liquids.

The tub comprises a perforated dividing wall that at least partly divides the cavity of the inner tub compartment, said wall having a drainage hole that can be closed with a floating closure component arranged in the cavity. This closure component closes the drainage hole when there is water in the lower tub part. The assembly plane can divide off the perforated dividing wall and also the drainage hole.

Also, when the bulge is arranged in the lower tub part, part of the bulge extends from the lower tub part to the upper tub part via the assembly plane, defining part of the cavity as a pressure chamber; the pressure chamber is connected to the inner tub compartment by a lower chamber part and is isolated from the inner tub compartment by an upper chamber part; the ventilation hole is arranged in the higher part of the pressure chamber.

In this way, it is possible to include the pressure bell part in the two tub shells, which complete it upon hermetic closure, thereby avoiding having to use a different part therefor. It is this pressure chamber that is used to control the water level inside the tub. In the method for injection-molding the plastic of the shells, the use of runners is dispensed with, thereby greatly facilitating production, which is hence faster and therefore less expensive.

Furthermore, when the bulge is arranged in the lower tub part it has a heating-element opening that is open in the tub closure direction, into which a heating element can be inserted and fixed, said heating element being arranged in the cavity in order to heat the washing water. In this way, the use of runners is likewise dispensed with in the injection mold.

BRIEF DESCRIPTION OF THE DRAWINGS

The invention is now described below in greater detail, on the basis of schematic drawings. The figures show.

DETAILED DESCRIPTION OF EXEMPLARY EMBODIMENTS OF THE PRESENT INVENTION

In the figures, elements that are identical or that fulfill the same function bear the same reference numerals.

Figure 1:
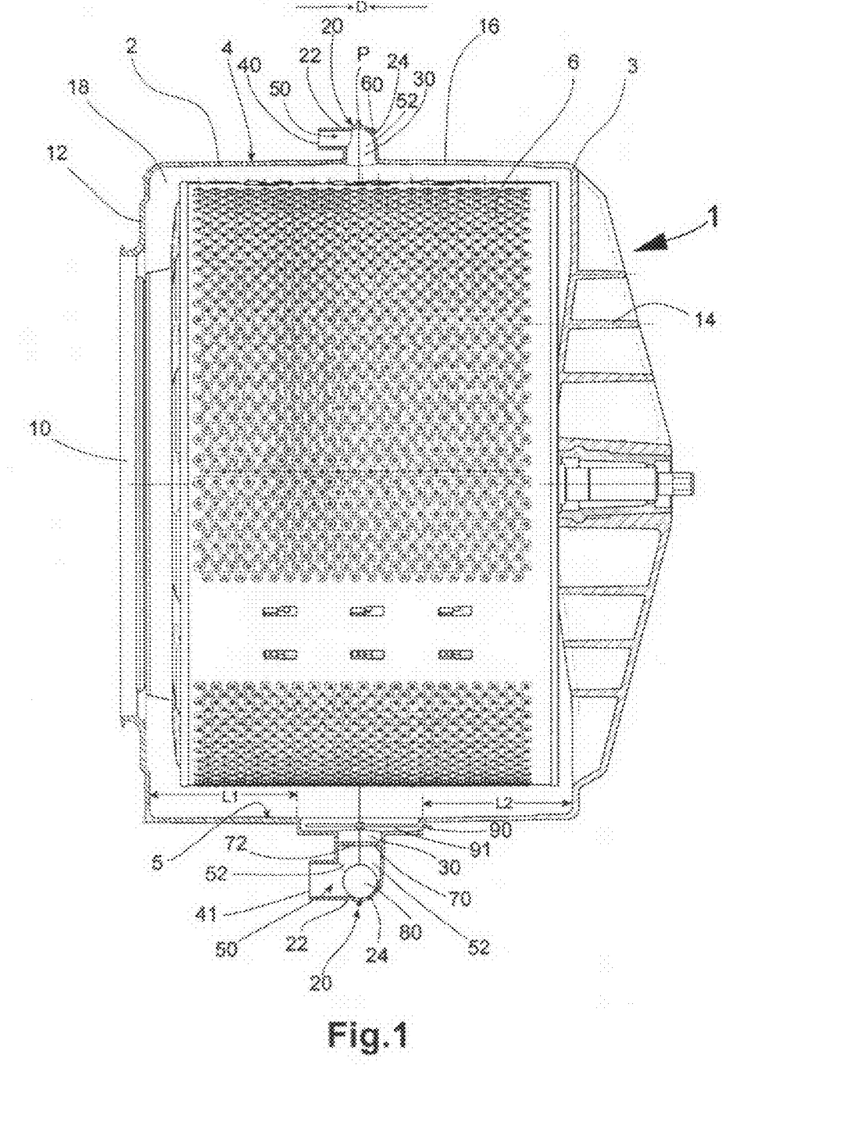
FIG. 1 A schematic cross section of a front-loading washing-machine tub with a drum inside it, according to the invention.

FIG. 1 shows a schematic cross section of a tub 1 of a washing machine for front loading via a loading mouth 10, with a drum 6 inside it, according to a first embodiment of the invention. The tub 1 is produced from plastic molded using plastic injection-molding technology and it has a front wall 12, a rear wall 14 and a cylindrical wall 16 enclosing an inner tub compartment 18. The tub 1 comprises two shells 2, 3 made from plastic molded by means of injection-molding, which are connected together by means of an assembly plane P in a tub closure direction D using vibration or similar welding technology. The first tub shell 2 comprises the front wall 12 and the second tub shell 3 comprises the rear wall 14.

In the lower part 5 of the cylindrical wall 16 of the tub there is an integral bulge 20 projecting from the cylindrical wall and defining a cavity 30 connecting to the inner tub compartment 18. The bulge 20 has an outlet opening 41 defined in the first tub shell 2.

The assembly plane P divides the bulge 20 into two parts, in which a first bulge part 22 is arranged in the first tub shell 2 and a second bulge part 24 in the second tub shell 3.

The bulge 20 has a conduit 50 in the tub closure direction D, divided by the assembly plane P, which places the cavity 30 in communication with the outlet opening 41. In the first tub shell 2, the corresponding conduit part 52 of the conduit 50 is open in the assembly plane P, which, upon closure of the tub 1 with the second tub shell 3, is in communication with the conduit part 52 of this second shell, which is in communication with the outlet opening 41.

The bulge 20 is centered in the cylindrical wall 16, projecting therefrom at a bulge distance L1 from the front wall 12 and at a distance L2 from the rear wall 14.

The bulge comprises a perforated dividing wall 70 that divides the bottom part of the cavity 30 from the inner tub compartment 18. The dividing wall has a drainage hole 72 that can be closed with a floating closure element 80 arranged in the bottom part of the cavity 30.

The bulge 20 has a heating-element opening 90 that is open in the tub closure direction D, in which a heating element 92 is inserted and fixed.

In the upper part 4 of the cylindrical wall 16 of the tub there is an integral upper bulge 20 projecting from the cylindrical wall and defining a cavity 30 connecting to the inner tub compartment 18. The bulge 20 has an inlet opening 40 defined in the first tub shell 2.

The assembly plane P divides the upper bulge 20 into two parts, a first bulge part 22 being arranged in the first tub shell 2 and a second bulge part 24 in the second tub shell 3. The second shell 3 has a ventilation hole 60 open in the tub closure direction D.

The upper bulge 20 has a conduit 50 in the tub closure direction D divided by the assembly plane P, which places the cavity 30 in communication with the inlet opening 40. In the first tub shell 2, the corresponding conduit part 52 of the conduit 50 is open in the assembly plane P, which upon closure of the tub 1 with the second tub shell 3 is in communication with the conduit part 52 of this second shell, which is in communication with the inlet opening 40.

The upper bulge also is centered in the cylindrical wall 16. The tub may have one or more inlet and/or outlet bulges, each with at least one opening.

Figure 1A:
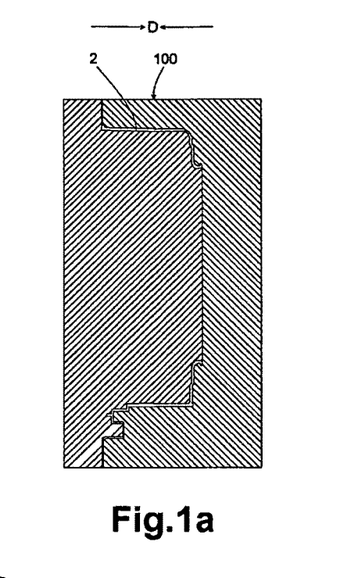
FIG. 1a A simplified, schematic cross section of an injection mold for plastic for one of the shells of the tub of the first embodiment of the invention, in the closed position.

FIG. 1a shows a simplified, schematic cross section of the injection mold 100 for plastic for one of the shells of the tub of the first embodiment of the invention, in the closed position.

Figure 1B:
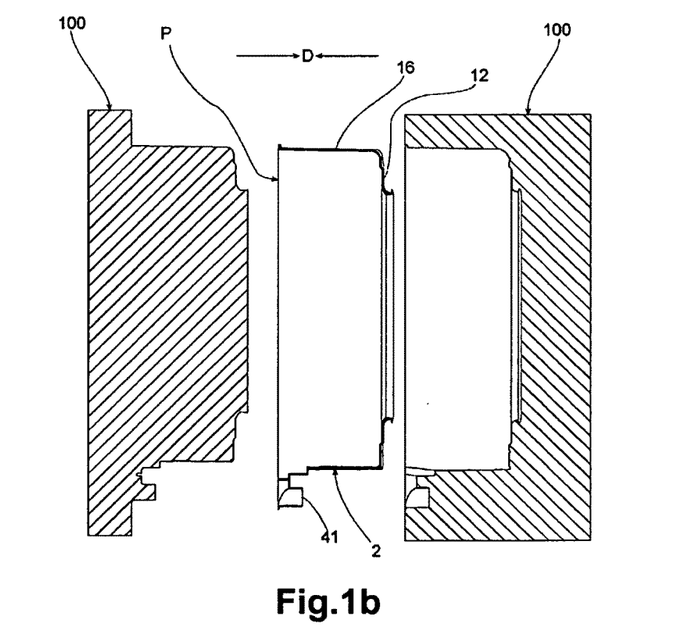
FIG. 1b A simplified, schematic cross section of the injection mold for plastic of one of the shells of the tub of the first embodiment of the invention, in the open position, with the shell between the two parts of the mold.

FIG. 1b shows a simplified, schematic cross section of the injection mold 100 for plastic for one of the shells of the tub of the first embodiment of the invention, in the open position with the first shell 2 between the two parts of the mold, with an outlet opening 41. The mold of the two shells 2 and 3 opens and closes in the assembly direction D.

Figure 2:
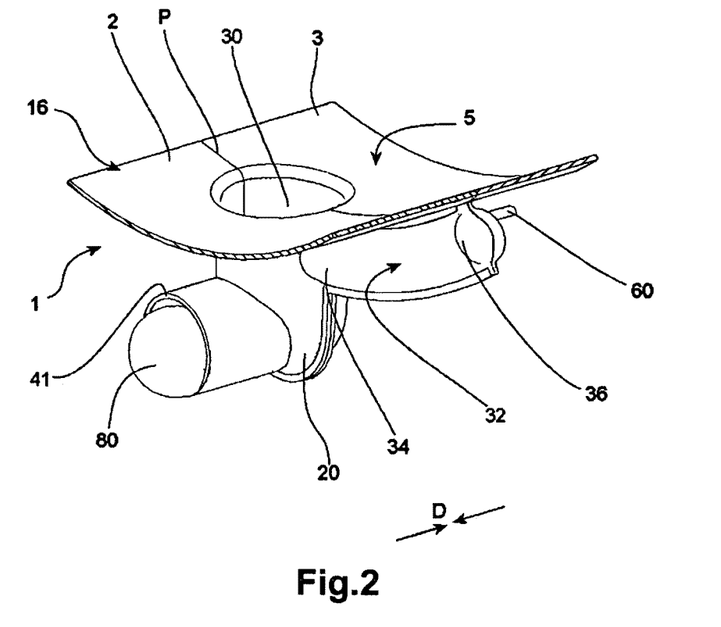
FIG. 2 A portion, in perspective, of the lower tub part of the first embodiment of the invention, with the bulge and the outlet opening for liquids.

FIG. 2 shows a portion, in perspective, of the lower tub part of the first embodiment of the invention, with the bulge 20 and the liquid-outlet opening 41. The circular (in this case) diameter of the outlet opening 41 is greater than the diameter of the floating closure 80, which in this case is spherical.

In the lower part 5 of the cylindrical wall 16 of the tub there is an integral bulge 20 projecting from the cylindrical wall and defining a cavity 30. The bulge 20 has an outlet opening 41 defined in the first tub shell 2.

The assembly plane P divides the bulge 20 into two parts, a first bulge part 22 being arranged in the first tub shell 2 and a second bulge part in the second tub shell 3. Part of the bulge 20 extends from the lower tub part 5 to the upper tub part via the assembly plane P, defining a part of the cavity 30 as a pressure chamber 32. The pressure chamber 32 is connected to the inner tub compartment by a lower chamber part 34 and is isolated from the inner tub compartment by an upper chamber part 36. The pressure chamber 32 has a ventilation hole 60 arranged in the upper part of the pressure chamber 36.

Figure 2A:
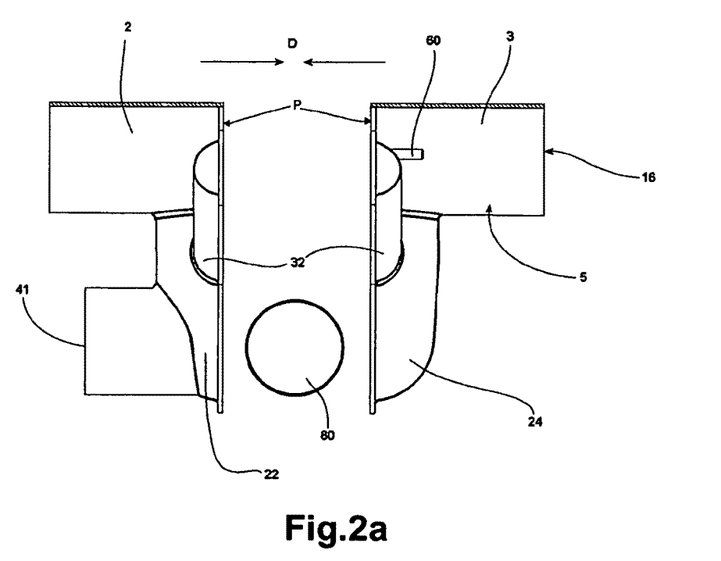
FIG. 2a A portion, in elevation, of the lower tub part of the first embodiment of the invention, with the bulge and the opening for the outlet of liquids.

FIG. 2a shows a portion, in side elevation, of the lower tub part 5 of the first embodiment of the invention described in FIG. 2, with the bulge 20, the liquid-outlet opening 41 and the pressure chamber 32.

Figure 2B:
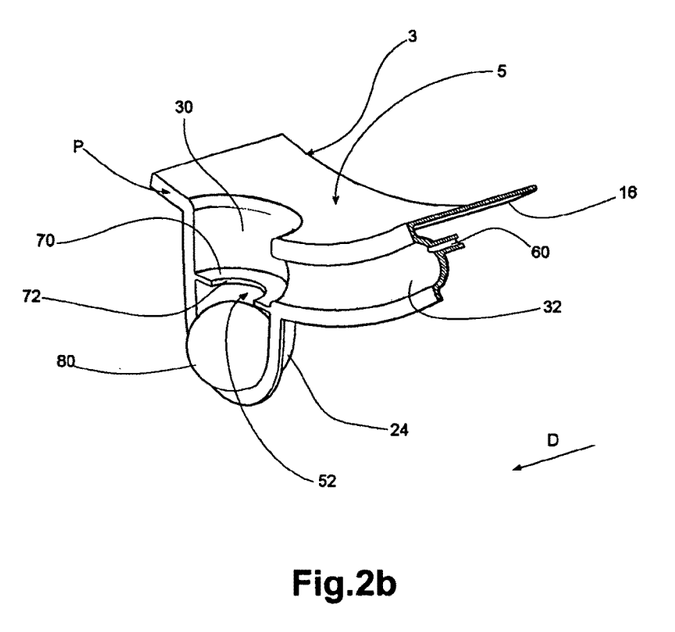
FIG. 2b A portion, in perspective, of the lower part of the second tub shell of the first embodiment of the invention, with the second bulge part and corresponding part of the pressure chamber.

FIG. 2b shows a portion, in perspective, of the lower part of the second tub shell 3 of the first embodiment of the invention shown in FIG. 2, with the second bulge part 24 and corresponding part of the pressure chamber 32. Also shown is a cross section of the ventilation hole 60 in the tub closure direction D. The floating closure 80 is arranged in its operating position, below the dividing wall part 70, with its drainage hole 72 in the conduit part 52 of the second shell 3.

Figure 2C:
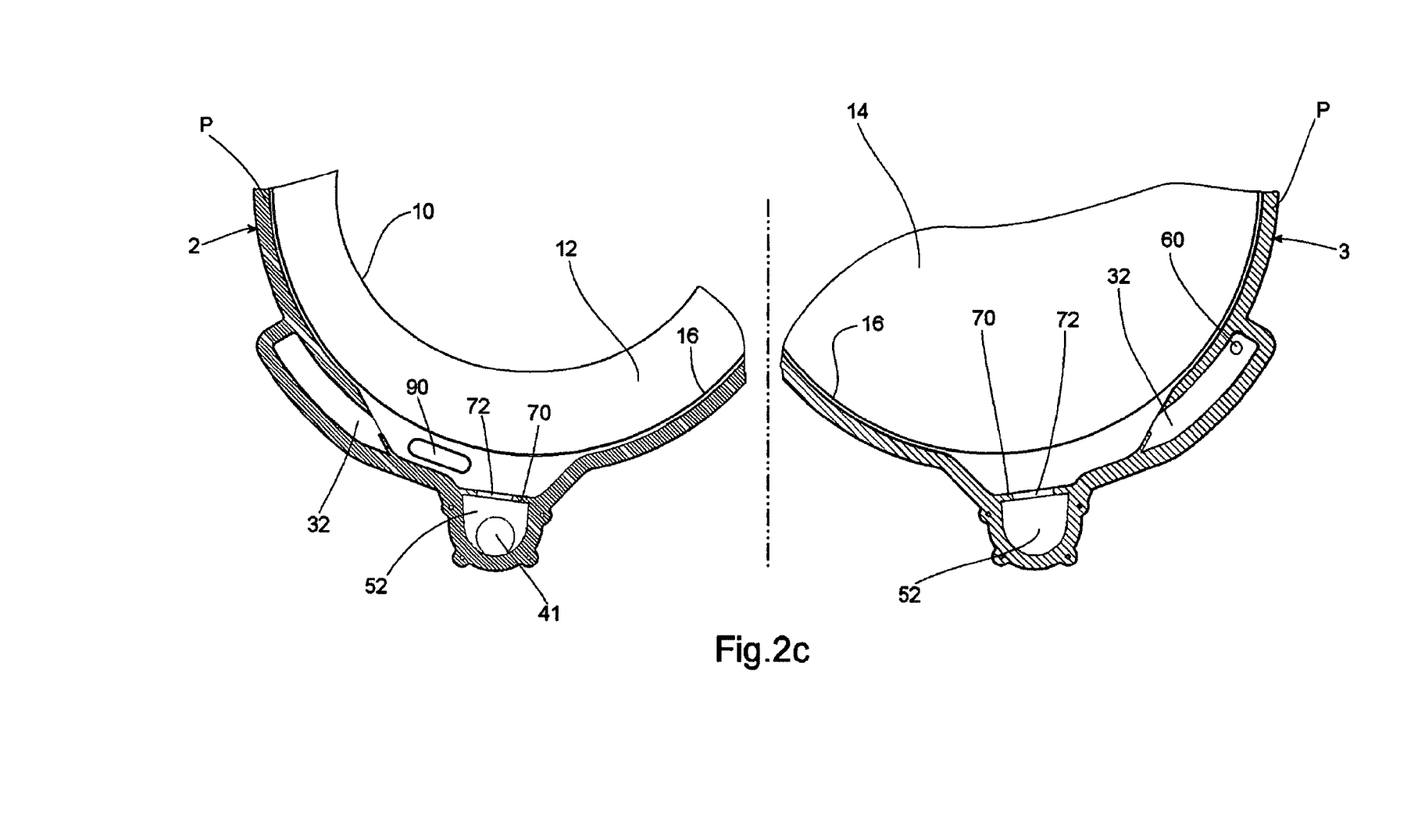
FIG. 2c A cross section, in plan, from the assembly plane of the two tub shells of the first embodiment of the invention through the lower part thereof, with the bulge and the opening for the outlet of liquids.

FIG. 2c shows a cross section, in plan, in the assembly plane of the two tub shells 2 and 3 of the first embodiment of the invention described in FIG. 2, through the lower part thereof with the bulge and the liquid-outlet opening 41. The bulge in the first shell 2 has a heating-element opening 90 that is open in the tub closure direction D. The pressure chamber 32 has a wall in the lower chamber part 34, partially closing same. The first shell 2 has the loading mouth 10 of the tub and the outlet opening 41. The two tub shells 2 and 3 are joined by welding in the shaded area of the figure, which is part of the assembly plane P.

Figure 2D:
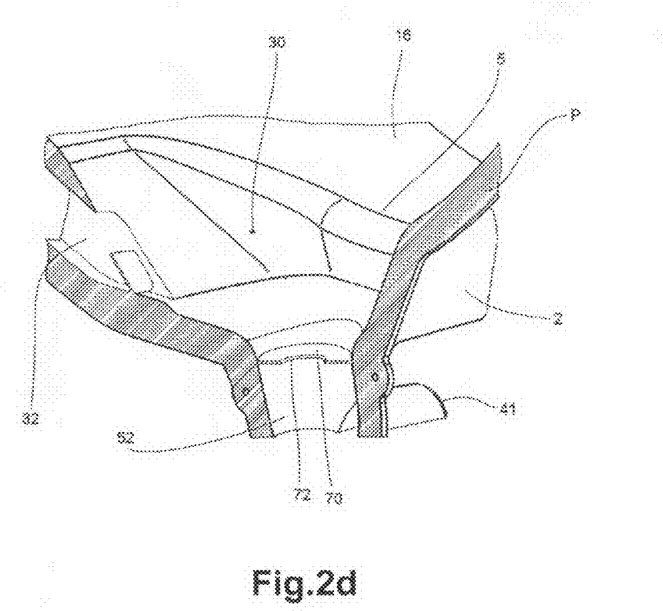
FIG. 2d A portion, in perspective, of the lower part of the first tub shell of the first embodiment of the invention, with the first bulge part, outlet opening and corresponding part of the pressure chamber.

FIG. 2d shows a portion, in perspective, of the lower part of the first tub shell of the first embodiment of the invention described in FIG. 2b, with the first bulge part, outlet opening and corresponding part of the pressure chamber.

Figure 2E:
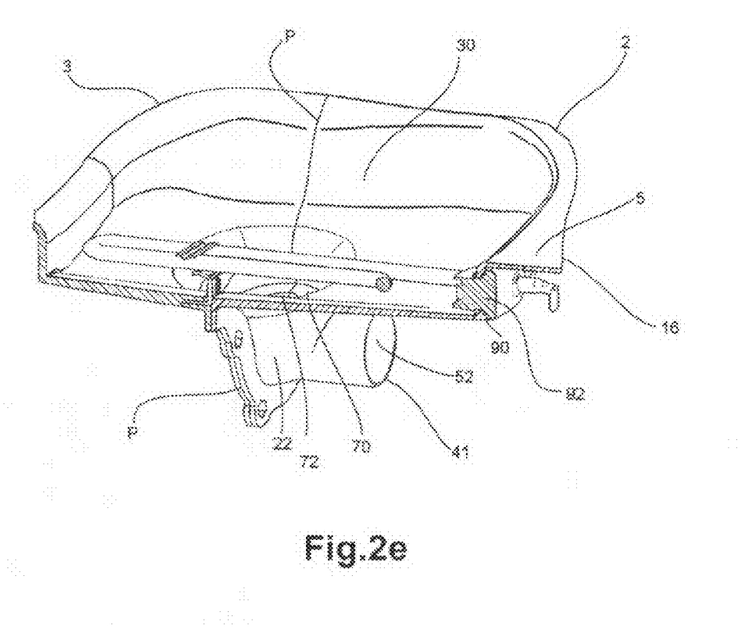
FIG. 2e A portion, in perspective, of the lower tub part of the first embodiment of the invention, with the bulge, the opening for the outlet of liquids and the heating element inserted in the bulge.

FIG. 2e shows a portion, in perspective, of the lower tub part of the first embodiment of the invention described in FIG. 2, with the bulge 20, the liquid-outlet opening and the heating element 92 inserted in the bulge 20 through the heating-element opening 90. In the parting line there are holes by means of which the two tub shells 2 and 3 may be screwed together in order to improve leaktightness.

Figure 3:
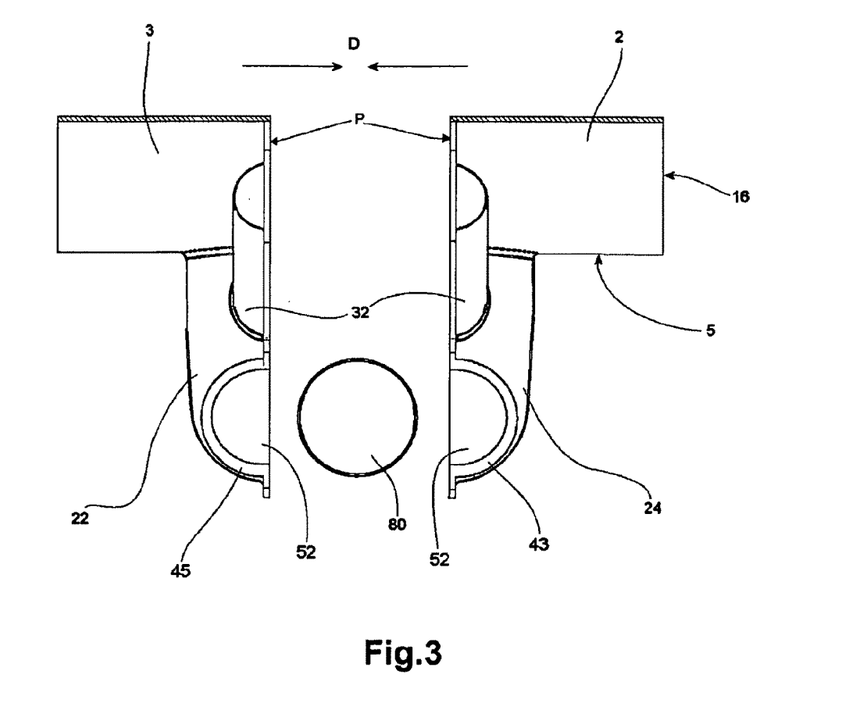
FIG. 3 A portion, in side elevation, of the lower tub part of the second embodiment of the invention, with the bulge and the opening for the outlet of liquids formed by the two shells.

FIG. 3 shows a portion, in lateral elevation, of the lower tub part 5 of the second embodiment of the invention, with the two shells separated prior to being welded and, in between, the floating closure 80 located in its operating position with the bulge 20 and the liquid-outlet opening 41 formed by the two shells 2 and 3.

The assembly plane P divides the outlet opening 41, leaving a first opening part 43 in the first bulge part 22 and a second opening part 45 in the second bulge part 24, and the conduit 50 in each part of the bulge 22 and 24 has an at least partial channel form, thereby forming a tubular conduit when the tub is closed.

Figure 3A:
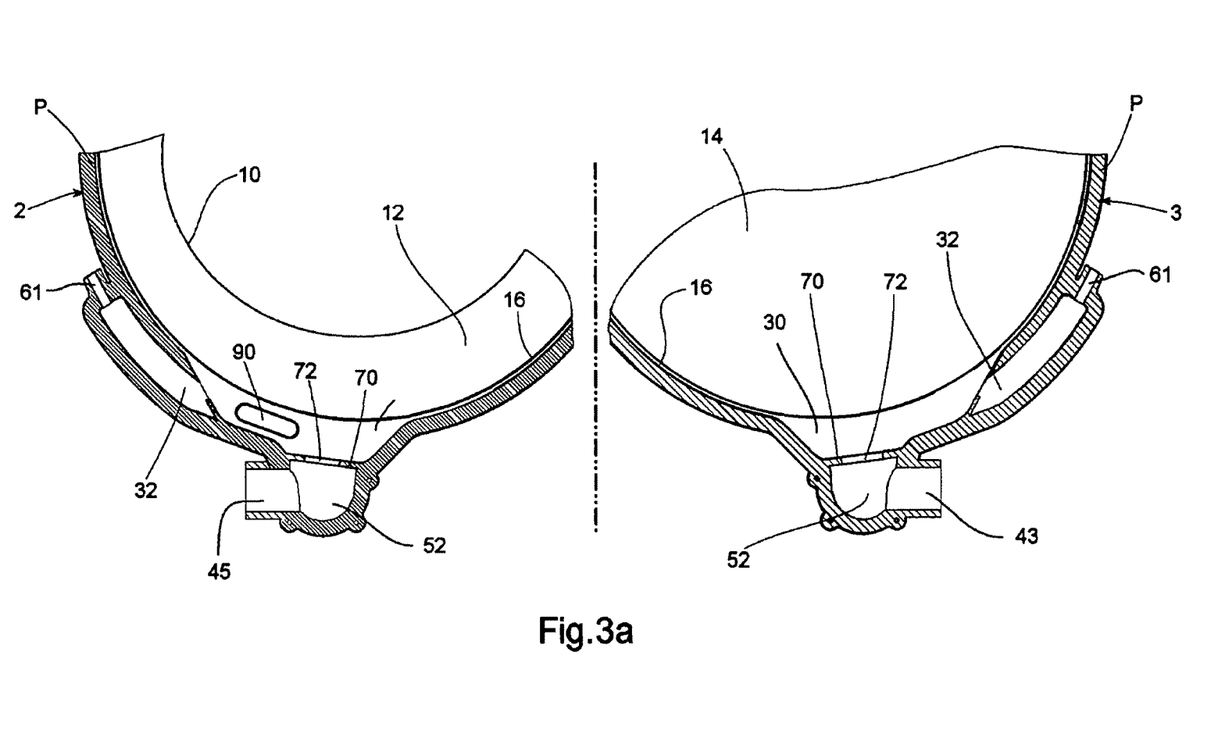
FIG. 3a A cross section, in plan, from the assembly plane of the two shells through the lower tub part of the second embodiment of the invention, with the bulge and the opening for the outlet of liquids divided by the assembly plane.

FIG. 3a shows a cross section, in plan, of the two shells 2 and 3 placed one beside the other in the assembly plane through the lower tub part of the second embodiment of the invention with the bulge and the liquid-outlet opening divided by the assembly plane into two opening parts 43 and 45. Also shown is the pressure chamber 32 extending from the bottom part of the tub to the top part of the tub, and in the upper chamber part there is the ventilation hole 61 that is formed in the assembly plane P, part of the hole being defined in the first shell 2 and part in the second shell 3.

Figure 4:
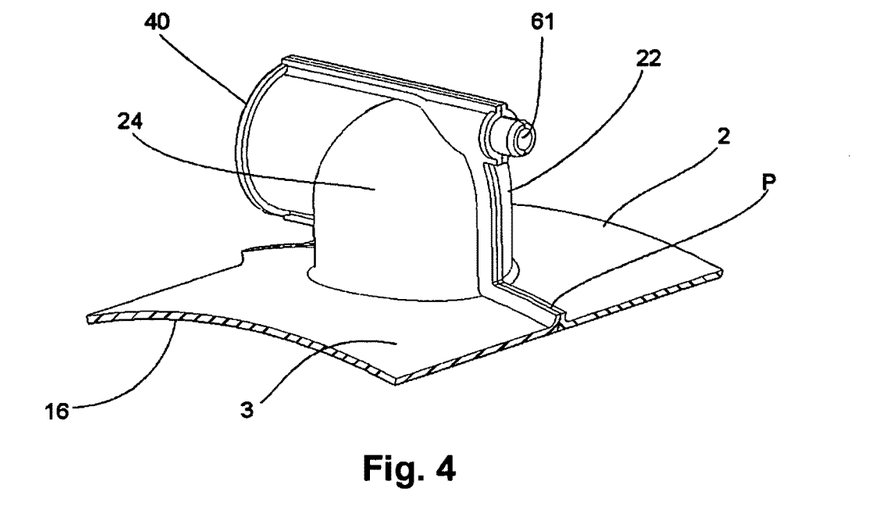
FIG. 4 A portion, in perspective, of the upper tub part of the third embodiment of the invention, with the bulge and the opening for the inlet of liquids formed by the two shells.

FIG. 4 shows a portion, in perspective, of the upper tub part of the third embodiment of the invention, with the bulge and the liquid-inlet opening 40 formed by the two shells 2 and 3. The ventilation hole 61 also is divided in the two shells and has a tubular form when said shells are joined via the assembly plane P.

Figure 4A:
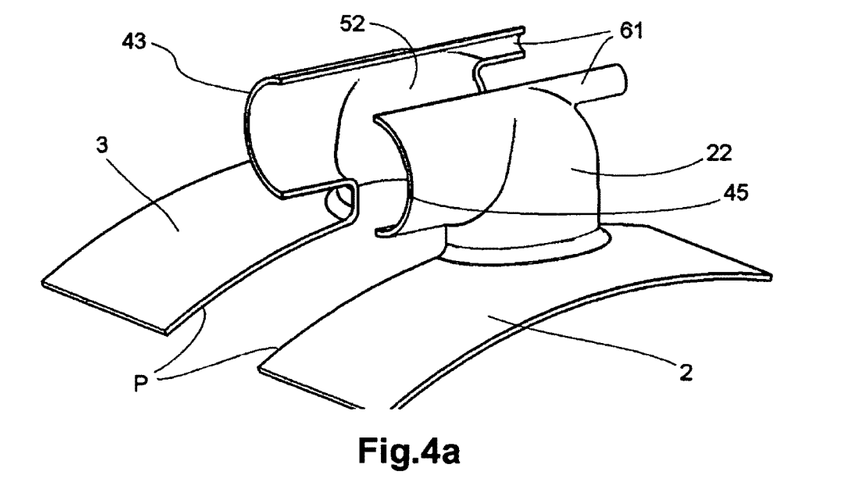
FIG. 4a A portion, in perspective, of the upper tub part of the third embodiment of the invention, with the bulge and the opening for the inlet of liquids formed by the two shells prior to their being joined by means of the assembly plane.

FIG. 4a shows a portion, in perspective, of the upper tub part of the third embodiment of the invention of FIG. 4 with the bulge and the liquid-inlet opening formed by the two shells prior to their being joined via the assembly plane, in which the inlet opening 40 is divided into a first opening part 43 and a second opening part 45.

Figure 5:
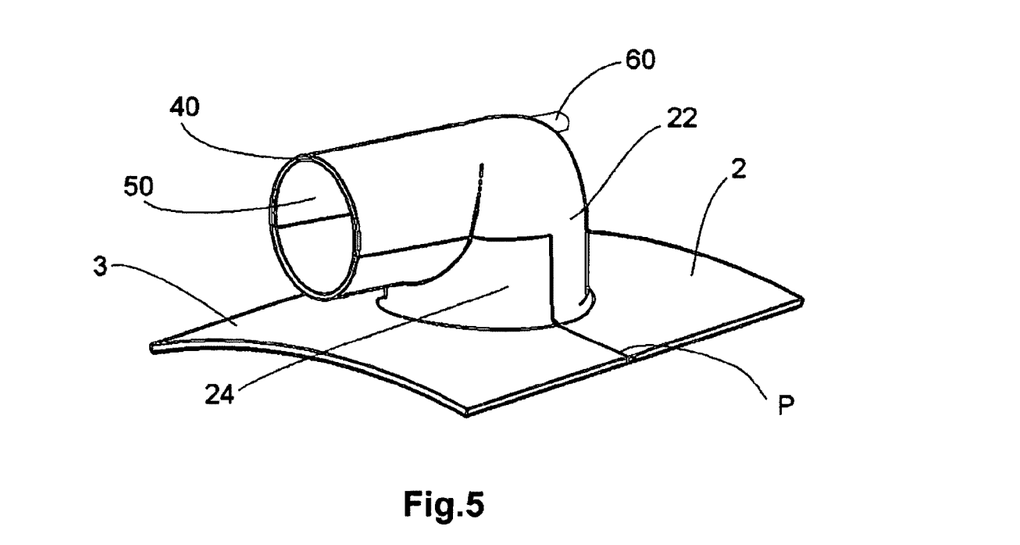
FIG. 5 A portion, in perspective, of the upper tub part of the fourth embodiment of the invention, with the bulge and the opening for the inlet of liquids formed by the two shells in a stepped plane.

FIG. 5 shows a portion, in perspective, of the upper tub part of the fourth embodiment of the invention, with the bulge and the liquid-inlet opening formed by the two shells in a staggered plane.

Figure 5A:
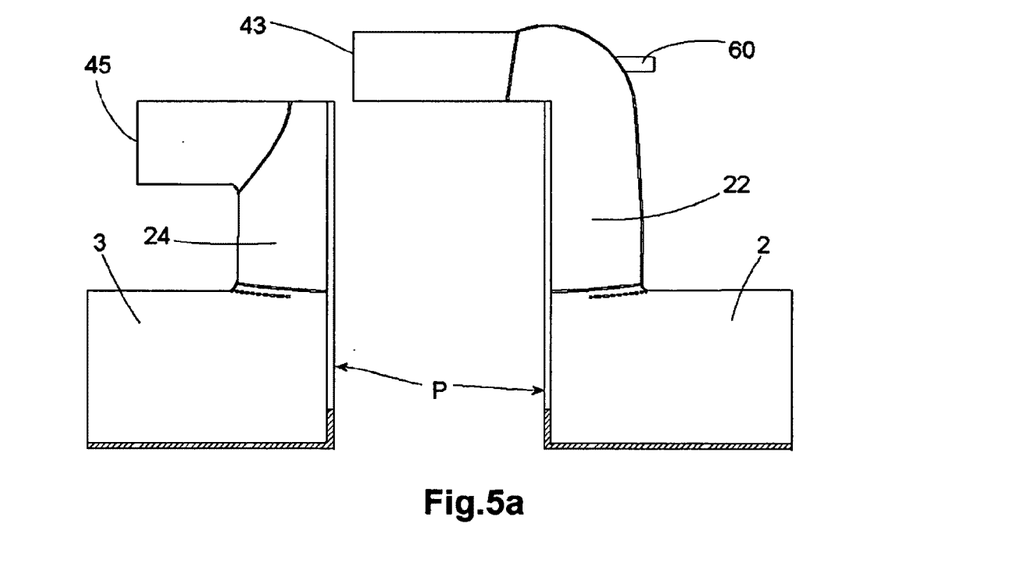
FIG. 5a A portion, in perspective, of the upper tub part of the third embodiment of the invention, with the bulge and the opening for the inlet of liquids formed by the two shells prior to their being joined via the stepped assembly plane.

FIG. 5a shows a portion, in perspective, of the upper tub part of the third embodiment of the invention, with the bulge and the liquid-inlet opening formed by the two shells prior to their being joined via the staggered assembly plane, showing the two parts 43 and 45 of the inlet opening.

1 Tub
100 Injection mold
2 First tub shell
3 Second tub shell
4 Upper part of the tub
5 Lower part of the tub
6 Drum
10 Loading mouth
12 Front wall
14 Rear wall
16 Cylindrical wall
18 Inner tub compartment
20 Bulge
22 First bulge part
24 Second bulge part
30 Cavity
32 Pressure chamber
34 Lower chamber part
36 Upper chamber part
40 Water-inlet opening
41 Water-outlet opening
43 First opening part
45 Second opening part
50 Conduit
52 Conduit part
60, 61 Ventilation hole
70 Dividing wall
72 Drainage hole
80 Floating closure
90 Heating-element opening
92 Heating element
P Assembly plane
D Tub closure direction
L1, L2 Bulge distance

The invention claimed is:

1. A plastic washing-machine tub comprising:
a cylindrical wall enclosing an inner tub compartment, which comprises:
a first injection-molded plastic tub shell forming a front wall; and
a second injection-molded plastic tub shell forming a rear wall and connectable to the first injection-molded tub shell along an assembly plane in a tub closure direction; and
an integral bulge emerging from the cylindrical wall and defining a cavity connected to an inner tub compartment, the integral bulge having an inlet and/or an outlet opening and a conduit in the tub closure direction divided by the assembly plane, wherein the conduit places the cavity in communication with the inlet and/or outlet opening,
the integral bulge further comprising:
a first bulge part in the first injection-molded plastic tub shell; and
a second bulge part in the second injection-molded plastic tub shell and divided from the first bulge part by the assembly plane,
wherein one of the first bulge part and the second bulge part forms at least part of the inlet and/or outlet opening.

2. The plastic tub of claim 1, wherein one of the first bulge part and the second bulge part forms the entire inlet and/or outlet opening, and
wherein the inlet and/or outlet opening is open in the tub closure direction.

3. The plastic tub as claimed in claim 1, wherein the assembly plane divides the inlet and/or outlet opening, leaving a first opening part in the first bulge part and a second opening part in the second bulge part, and the first bulge part forms a first portion of the conduit and the second bulge part forms a second portion of the conduit.

4. The plastic tub of claim 1, wherein the integral bulge comprises a ventilation hole.

5. The plastic tub of claim 4, wherein the assembly plane divides the ventilation hole such that a first portion of the ventilation hole is formed by the first bulge part and a second portion of the ventilation hole is formed by the second bulge part.

6. The plastic tub of claim 4, wherein the ventilation hole is open in the tub closure direction.

7. The plastic tub of claim 1, wherein the first injection-molded plastic tub shell and the second injection-molded plastic tub shell are connected by a weld.

8. The plastic tub of claim 7, wherein the weld comprises a vibration weld, a cast weld, a hot plate weld, or an ultrasonic weld.

9. The plastic tub of claim 1, wherein the integral bulge is centered in the cylindrical wall and projects from the cylindrical wall at a bulge distance from the front wall and/or from the rear wall.

10. The plastic tub of claim 1, wherein when the tub is in an operating position, the integral bulge is in an upper tub part and the inlet and/or outlet opening is an opening for an inlet of washing water into the inner tub compartment.

11. The plastic tub of claim 1, wherein when the tub is in an operating position, the integral bulge is in a lower tub part and the inlet and/or outlet opening is an opening for an outlet of washing water for emptying water from the inner tub compartment.

12. The plastic tub of claim 11, further comprising a perforated dividing wall that divides off at least part of the cavity of the inner tub compartment.

13. The plastic of claim 12, wherein the dividing wall has a drainage hole that can be closed with a floating closure element in the cavity.

14. The plastic tub of claim 11, wherein part of the integral bulge extends from a lower tub part to an upper tub part along the assembly plane, defining a part of the cavity as a pressure chamber, the pressure chamber being connected to the inner tub compartment by a lower chamber part and being isolated from the inner tub compartment by an upper chamber part, wherein a ventilation hole is in the upper part of the pressure chamber.

15. The plastic tub of claim 11, wherein the integral bulge further comprises a heating-element opening open in the tub closure direction into which a heating element can be inserted and fixed.

16. A washing machine, comprising a plastic tub with:
- a cylindrical wall enclosing an inner tub compartment, which comprises:
    - a first injection-molded plastic tub shell forming a front wall; and
    - a second injection-molded plastic tub shell forming a rear wall and connectable to the first injection-molded tub shell along an assembly plane in a tub closure direction; and
- an integral bulge emerging from the cylindrical wall and defining a cavity connected to an inner tub compartment, the integral bulge having an inlet and/or an outlet opening and a conduit in the tub closure direction divided by the assembly plane, wherein the conduit places the cavity in communication with the inlet and/or outlet opening,
    the integral bulge further comprising:
    - a first bulge part in the first injection-molded plastic tub shell;
    - a second bulge part in the second injection-molded plastic tub shell and divided from the first bulge part by the assembly plane,
    - wherein one of the first bulge part and the second bulge part forms at least part of the inlet and/or outlet opening.

17. The washing machine of claim 16, wherein the washing machine comprises a front-loading washing machine.

18. The washing machine of claim 16, wherein the washing machine comprises a top-loading washing machine with the plastic tub in a horizontal position.

* * * * *

UNITED STATES PATENT AND TRADEMARK OFFICE
CERTIFICATE OF CORRECTION

PATENT NO.       : 8,511,117 B2
APPLICATION NO.  : 12/673789
DATED            : August 20, 2013
INVENTOR(S)      : Borque Marquina et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Fifteenth Day of September, 2015

Michelle K. Lee
*Director of the United States Patent and Trademark Office*